Aug. 26, 1930.  R. ERBAN  1,774,176
FRICTIONAL GEARING
Filed June 9, 1925    2 Sheets-Sheet 1

Inventor
R. Erban
By Marks Clerk
Attys

Patented Aug. 26, 1930

1,774,176

UNITED STATES PATENT OFFICE

RICHARD ERBAN, OF VIENNA, AUSTRIA

FRICTIONAL GEARING

Application filed June 9, 1925, Serial No. 35,988, and in Austria June 16, 1924.

My invention relates to frictional gearings of the type in which frictional rollers are employed to transmit power from the driving shaft to the driven shaft. The invention in particular relates to the holding and guiding of said rollers.

Frictional gearings having rollers are old. However, in all frictional gearings of this type in which the balls commonly used are replaced by rollers difficulties are experienced, particularly in connection with the holding, journalling and guiding of the rollers. In general, it is necessary to employ a very hard material for the races and rollers, such as hardened steel, and in this case the geometrical axes of rotation of the two bodies which roll upon each other must very accurately coincide with one and the same plane of rotation to avoid lateral deviation of the rollers. If the above condition is not very rigorously complied with, so that the axes are crossing, slight as the diviation may be, the rollers are departing from their prescribed running circle and take a lateral course with considerable strength. The forces produced by this tendency of the rollers are in many instances so considerable that a rapid wearing or even destruction of the gear will ensue. The efficiency of the gearing is in any case greatly impaired and in the case of variable speed gears all these forces must moreover be taken up by the governing mechanism of the rollers and must be overcome when the rollers are set to the desired position.

As already explained, the requirements are in theory easy to meet in fixed friction gearings, in which only a fixed reduction or increase of speed takes place, by an absolutely accurate positioning and holding of the rollers. However, such a device is somewhat difficult to construct with the required high accuracy and moreover, it is impossible to find a solution on this base for frictional gears with variable speed transmission ratio. In variable speed gears it is essential that during the speed-change adjustment the geometrical axes of two bodies rolling upon each other as for instance the race ring and the roller are crossing and do not transect each other.

In the case of tilting rollers it has been moreover proposed to obtain an indirect regulating action by compulsory crossing of the axes to a certain extent. It is however very difficult to control a plurality of rollers exactly in the same way and to the same extent, so that they will all run exactly on the same circle. If this is not the case each roller will have its own speed transmission ratio and there exist differences of speed between the rollers which of course result in heavy losses.

Now applicant found that all the above defects are entirely overcome by providing rollers freely adjustable in all directions which have the same degrees of free movement as a ball would have. The rollers are therefore so mounted that they have three degrees of free movement (in most cases one of them without limitation and the other two within certain limits) while all arrangements hitherto known provided only for two degrees of free movement (one of them without limitation and one within limits). This will entirely eliminate the difficulties experienced in connection with roller gears, as these difficulties did not originate as was erroneously supposed in a defective shape of the rollers and races, but in the fact that the rollers were positively compelled to take an incorrect position with respect to the third degree of free movement.

In the drawing illustrating some constructional arrangements in which the general principle upon which the invention is based, is embodied, Fig. 1 shows diagrammatically one embodiment of the invention partly in section with a ball-shaped bearing for the roller.

Figure 1:
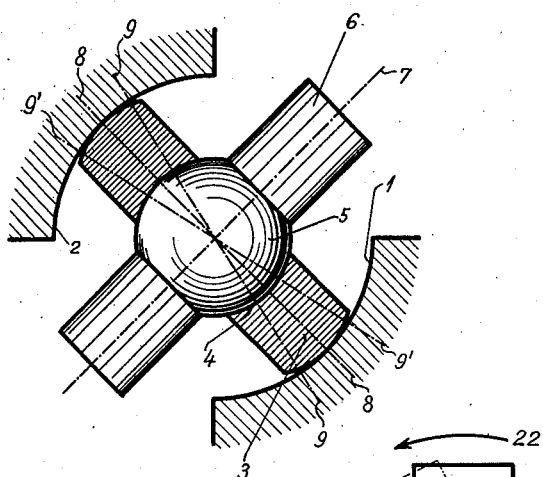

Fig. 1 shows only diagrammatically part of a transmission gear of the kind referred to, such as for instance described in my earlier Patent No. 1,585,140 or my copending application No. 668,342. A gear of this type as will be seen from Fig. 6 consists essentially of a driving shaft 25 upon which are keyed or otherwise fixed, for instance, by means of bolts 33, one of the pressure disks 32 of a pressure device, which consists of rollers or balls 30 inserted between inclined faces on said disk 32 on one hand and on the inner race ring 1 of the gear on the other hand. The rollers or balls 30 may be held by a cage 31 and the whole pressure device may be preferably of the kind described in my copending application Ser. No. 734,115. Loosely mounted on the shaft 25 is the inner race ring 1, which is coupled with the driving shaft by means of the said pressure device 32, 30. The race has a toric surface, a section through it being part of a circle, with its center coincident with the center of the roller 3, which runs upon the race. A second outer race 2 is provided which by means of the disk 23 is connected with the driven shaft 24. The roller 3 is of the tilting type and enclosed between segments 18, 18', which are holding the axle 6 of the roller. Tilting may be effected by means of links 28, 29, which are fixed to said segments. A cage 26 may be interposed between the rollers to allow spacing of the same at convenient and equal distances. The cage as shown may be mounted loosely on one of the shafts.

Figure 6:
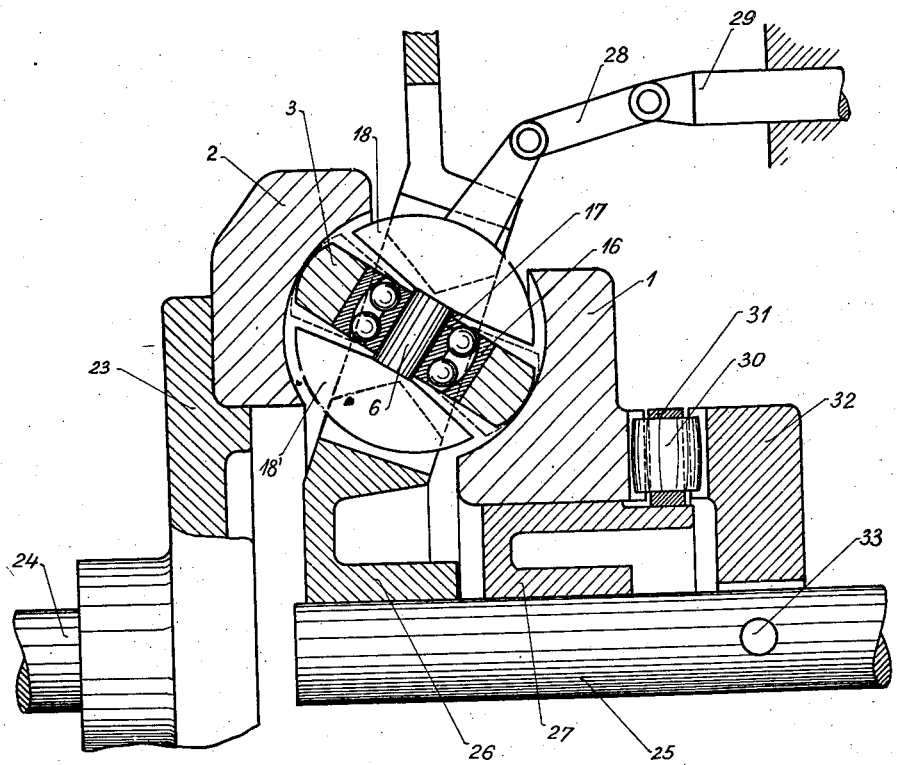
Fig. 6 shows part of a gearing in section with an arrangement according to Fig. 3 in operative condition.

The gear described in Fig. 1 may however be also of any other known or approved type as Fig. 6 illustrates only one example of the type of gear used.

In this figure the race rings are again designated by 1 and 2 and between them the tilting roller 3 is arranged thus transmitting power from one tilting roller. The roller is illustrated diagrammatically in section. To allow free adjustment it is provided with a hollow spherical bearing surface 4 which is capable of running on the sphere 5 provided with trunnions 6, 6. The geometrical axis of rotation 7 is marked in dotted lines and this axis corresponds to a plane of rotation 8—8. However the roller is freely movable on the sphere within certain limits and therefore the plane of rotation may take any position within the double conical space as indicated by the cone generatrices 9—9, 9'—9'. The roller 3 thus may freely rotate around the axis 7 and may moreover rotate freely within limits around two axes perpendicular thereto. The roller therefore has three degrees of free movement.

Figure 2:
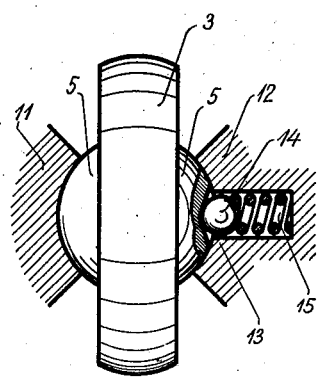
Fig. 2 shows a modification in which the ball-shaped bearing is integral with the roller or fixed thereto while the hollow special bearing surfaces are fixed.

Fig. 2 shows an arrangement of essentially the same description, in which however the ball 5 is integral with the roller 3 or fixed thereto while the bearing surfaces 11, 12 are fixed.

It would appear that the method of journalling the rollers described and illustrated involves the inconvenience that the rollers will constantly oscillate within the limits of their free movement, as there exists no definitely and positively maintained position of the axes. However I have found that this is only the case if the rotational velocity is very small. At a very moderate rotational velocity the rollers are perfectly stabilized. To provide however also for the case of very small speeds of the rollers and for the case that no load is applied, a holding arrangement as shown on the right hand side of Fig. 2 may be employed. This device consists of a recess 13 in the sphere 5 into which a ball 14 enters on which presses a spring 15. This device is of course only an example as other retaining devices may be employed with equal effect.

Figure 3:
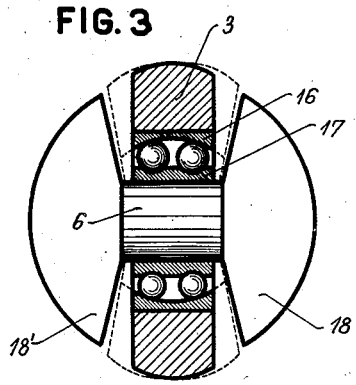
Fig. 3 illustrates another modification in which the roller is provided with a hollow spherical surface and a ball bearing upon which it may slide.

The preferred form of the arrangement is shown in Figs. 3 and 6, in which the roller 3 is journalled by means of a ball bearing 16—17. This arrangement is especially designed for frictional gearings with tilting rollers, in which the axle 6 is journalled in radial slots of a cage by means of sliding members 18, 18' as afore described with reference to Fig. 6 described in my copending application Ser. No. 668,342. In this case, though every ball bearing would meet the requirements, a special ball bearing is used having spherical races as this bearing allows to obtain special and novel results. This new result will be explained first with reference to Fig. 4. It can be obtained with all ball bearings having a spherical race on one side and grooves on the other side, if the groove is held and the spherical race is capable of rotating. Supposing in the diagram shown in Fig. 4 that the inner ring 17, which may be the normal ring of a ball bearing, is held while the outer ring 16 is to be rotated in the direction of the arrow 20 and while simultaneously pressure is applied from the right side as indicated by the arrow 21, then the race ring 16 will not simply shift to the left at the point where the force applies as could be expected but it will take the position shown in Fig. 4 and will tilt at 22, a point differing from that at which the force was applied by an angle of 90°, the same as a gyroscope would do if the force 21 were applied to it. The outer race ring will occupy the position shown in dotted lines and marked 16'. This occurs also in cases where the rotational velocity is so small that the gyroscopic action of the ring is practically negligible. It has however been found that the effect will increase with the load to which the ball bearing is subjected, i. e. the pressure of the balls between the inner and outer ring 17 and 16 respectively.

The effect is practically the same as in a gyroscope, the rollers are stabilized and have the tendency to remain in their plane of rotation. This can be utilized and this effect together with any gyroscopic effect that may occur will allow a very easy regulation and adjustment of the rollers. If the axes 6 are rocked, this rocking acts in the same way as the disturbance of the equilibrium of a gyroscope. The roller ultimately takes the new position to which the axes is forced and are stabilized in this position very rapidly as lateral oscillations can hardly occur owing to the very energetic damping action of the frictional resistance against lateral gliding of the rollers on their races.

Figure 4:
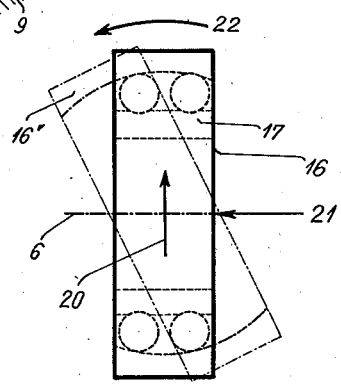
Fig. 4 is a diagram illustrating the special effect obtained by a ball bearing with spherical race rings.
Figure 5:
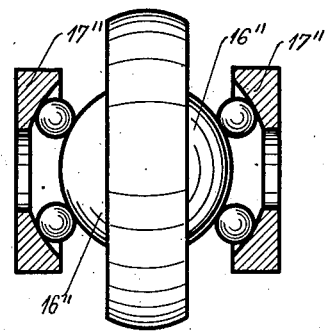
Fig. 5 shows further modification in which the race for the balls integral with or fixed to the roller is a convex spherical surface in contradistinction to the hollow spherical surface shown in Fig. 3.

Fig. 5 shows another modification which is based upon the same principle as Fig. 4 but with reversed conditions. The inner race 16'' is a sphere integral with or fixed to the roller, while the outer race ring is formed by grooves 17''.

Finally Fig. 6 shows the upper part of a section through a gearing showing tilting rollers with a ball bearing 16, 17, which is similar to the modification shown in Fig. 3 of the drawing. The drawing shows the way in which the invention is carried into effect with the type of gear which has been described above though it is obvious that the invention may also be utilized in other types of gearing comprising tilting rollers and is not bound to the special type of gear shown.

What I claim is:

1. In a friction gearing, a pair of race rings, a rolling body between and contacting with said race rings, the contacting surfaces of said race rings and said rolling body being shaped to allow the latter three degrees of free movement, and a pivot for said rolling body constructed to allow said rolling body the same three degrees of free movement, whereby the free main axis of rotation of said rolling body is stabilized around one preferred position relative to the common axis of the gearing.

2. In a friction gearing, a pair of race rings, a rolling body between and contacting with said race rings, the contacting surfaces of said race rings and said rolling body being concave and convex respectively to allow universal pivotal movement of the rolling body, and means mounting said rolling body for rotation and for universal pivotal movement.

3. In a friction gearing, a pair of race rings, a rolling body between and contacting with said race rings, the contacting surfaces of said race rings and said rolling body being concave and convex respectively to allow universal pivotal movement of the rolling body, and antifriction rolling means mounting said rolling body for rotation and for universal pivotal movement.

4. In a friction gearing, a pair of race rings, a rolling body between and contacting with said race rings, the contacting surfaces of said race rings and said rolling body being concave and convex respectively to allow universal pivotal movement of the rolling body, and means located at the center of the rolling body mounting said rolling body for rotation and for universal pivotal movement.

5. In a friction gearing, a pair of race rings, a rolling body between and contacting with said race rings, the contacting surfaces of said race rings and said rolling body being shaped to allow the latter three degrees of free movement, said rolling body having a spherical surface, and means cooperating with said surface to mount said rolling body for the same three degrees of free pivotal movement.

6. In a friction gearing, a pair of race rings, a rolling body between and contacting with said race rings, the contacting surfaces of said race rings and said rolling body being shaped to allow the latter three degrees of free movement, said rolling body having a spherical surface, and means inclusive of anti-friction rolling devices cooperating with said surface to mount said rolling body for the same three degrees of free pivotal movement.

7. In a friction gearing, a pair of race rings, a rolling body between and contacting with said race rings, the contacting surfaces of said race rings and said rolling body being shaped to allow the latter three degrees of free movement, said rolling body having an internal spherical surface, and means cooperating with said surface to mount said rolling body for the same three degrees of free pivotal movement.

In testimony whereof I affix my signature.

RICHARD ERBAN.